United States Patent [19]

Prendergast et al.

[11] Patent Number: 5,154,826

[45] Date of Patent: Oct. 13, 1992

[54] HYDROCYCLONE OVERFLOW TRANSPORT

[75] Inventors: Gavin J. J. Prendergast, Mount Waverley; David A. Webb, Northcote, both of Australia

[73] Assignee: Delawood Pty. Ltd., Australia

[21] Appl. No.: 490,693

[22] PCT Filed: Sep. 15, 1987

[86] PCT No.: PCT/AU88/00359

§ 371 Date: Mar. 14, 1990

§ 102(e) Date: Mar. 14, 1990

[87] PCT Pub. No.: WO89/02312

PCT Pub. Date: Mar. 23, 1989

[30] Foreign Application Priority Data

Sep. 15, 1987 [AU] Australia .................. PI4357

[51] Int. Cl.$^5$ ............................................. B04C 5/28
[52] U.S. Cl. ........................... 210/335; 210/512.1; 210/512.2; 210/787; 55/459.1; 209/211; 209/144
[58] Field of Search ............. 210/335, 512.1, 512.2, 210/787; 55/459.1; 204/211, 144

[56] References Cited

U.S. PATENT DOCUMENTS

| | | | |
|---|---|---|---|
| 2,765,918 | 5/1953 | Fontein et al. | 210/51 |
| 3,261,467 | 7/1966 | Wikdahl | 209/211 |
| 3,543,931 | 12/1970 | Rastatter | 210/512.2 |
| 4,148,721 | 4/1979 | Brown et al. | 209/211 |
| 4,148,722 | 4/1979 | Surakka et al. | 209/211 |
| 4,211,643 | 7/1980 | Frykhult et al. | 209/211 |

FOREIGN PATENT DOCUMENTS

| | | |
|---|---|---|
| 33952/78 | 8/1978 | Australia . |
| 8400156 | 2/1985 | PCT Int'l Appl. . |
| 8600111 | 4/1986 | PCT Int'l Appl. . |
| 8700398 | 6/1988 | PCT Int'l Appl. . |
| 693650 | 3/1951 | United Kingdom . |
| 1090978 | 11/1967 | United Kingdom . |
| 2136327 | 9/1984 | United Kingdom . |

OTHER PUBLICATIONS

Bradley, D., The Hydroclone, chapters 10 and 11, table of contents, and pp. 126, 152, 153, 162.
Black-Clawson 3" X-Clone (1985?).

*Primary Examiner*—Robert A. Dawson
*Assistant Examiner*—David Reifsnyder
*Attorney, Agent, or Firm*—Andrus, Sceales, Starke & Sawall

[57] ABSTRACT

Fluid separator apparatus comprising at least one cyclone (16A) for separating a fraction of less dense component(s) from predominantly fluid mixtures having at least one predominantly liquid component, said cyclone/s being provided with means defining at least one feed inlet (64), means defining at least one overflow outlet (72) for discharge of overflow comprising predominantly less dense component(s) of fluid mixtures, means defining at least one underflow outlet (66) for discharge of underflow comprising predominantly denser component(s) of said fluid mixtures, overflow conduit means (74) to receive and conduct said overflow away from said cyclone, said overflow conduit means (74) being connected securably to said overflow outlet means (72) of said cyclone (16A), support means (54) for supporting said cyclone/s in the form of a plate of pre-selected dimensions adapted to securably but releasably receive the body/bodies of said cyclone/s (16A) and receiving and transport means (78) to receive and transport said overflow away from said overflow conduit means (74) said receiving and transport means (78) being connected securably but releasably to said overflow conduit means. Additionally, said support means may form part of or be located on or within a pressure retaining vessel enclosing at least part of said cyclone/s.

5 Claims, 5 Drawing Sheets

HYDROCYCLONE OVERFLOW TRANSPORT

This invention relates to cyclone separators (hereinafter called "cyclones") for separating two or more fluids, to the transport of overflow after said overflow has been discharged from one or more cyclones, to means for effecting said transport, and to means for structural support for one or more cyclones. For the purposes of this specification, and unless a contrary intention should appear, "cyclone" includes a cyclone as described in the specification accompanying International Patent Application Number PCT/AU87/00398.

PRIOR ART

It is known that a cyclone for separating two or more fluids may have inlet means for introducing the fluid mixture to be separated, outlet means for fluid having a substantial concentration of less dense component (said fluid hereinafter called "overflow") and outlet means for fluid having a substantial concentration of more dense component (said fluid hereinafter called "underflow").

Many means have been devised for supporting and mounting a plurality of cyclones, at least partially inside a containing vessel. This is often important in the case of cyclones designed for the treatment of mixtures of fluid such as oil and water, since the source of the feed mixtures is often at high pressure, for example 10,000 kPa, and the design of single units may become complex. One such multi-cyclone apparatus is disclosed in Australian Patent Specification 33,119/84. This specification describes a liquid separator apparatus where one or more cyclones are enclosed in a pressure retaining shell. In another form of this application cyclones are connected in series within the same pressure retaining shell, wherein in use the underflow from one cyclone is fed into the next cyclone in the series via the feed inlet of said next cyclone.

An alternative form of apparatus is described in PCT/AU86/00111. In this embodiment a plurality of cyclones are combined together inside a pressure retaining shell. One feature of this apparatus is that the cyclone overflow outlets are combined into one stream and exit the vessel via one outlet. The overflow outlets are combined in a series of galleries and ports as part of the cyclone body.

Other forms of apparatus are described in "The Hydrocyclone" by D. Bradley (Pergamon Press, 1965). In particular, FIG. 86 in that text shows a number of cyclones mounted in a tube sheet or support plate which is wafered between two flanges surrounded by a pressure retaining shell.

Other patent specifications which describe multiple cyclone apparatus include:
U.S. Pat. No. 4,148,721, U.S. Pat. No. 4,211,643, U.S. Pat. No. 3,261,467 and AU-33,952/78. In addition the literature emanating from various cyclone manufacturers shows various forms of apparatus consisting of numbers of cyclones contained in vessels.

BACKGROUND TO THIS INVENTION

As described in the prior art, to avoid the complexity of numerous interconnections when a plurality of cyclones are required to treat a mixture, said cyclones are often grouped together inside pressure retaining vessels. However, a number of difficulties exist in applying the prior art to, for example, the crude oil and gas production and process industry. A typical feed mixture might include fluid mixtures of two or more components or phases of differing densities with at least one predominant liquid component. For example, the feed mixture might consist of oil and water with a small amount of gas and solids.

Problems often encountered include:
1. Cyclones are often assembled with a plurality of cyclones combined together as a permanent fixture. This means that it is often difficult to inspect, maintain, replace and service individual cyclone units. Furthermore, these cyclone assemblies are often very heavy;
2. Pressure retaining vessels are often manufactured and assembled using specially fabricated non-standard components. This increases the cost and complexity of designs;
3. Prior art arrangements can result in difficulty in readily removing and accessing the cyclones. Equipment serviceability and maintenance downtime are very important factors in, for example, offshore oil and gas production platforms;
4. Prior art arrangements do not, in general, allow ready inspection and cleaning of the small overflow outlet parts.

DESCRIPTION OF THIS INVENTION

It is an object of this invention to alleviate substantially the problems of the prior art in particular, though not exclusively, when applying cyclones to the treatment of fluid mixtures in the crude oil and gas production and processing industries. A typical feed mixture might consist of fluid mixtures containing at least a predominant liquid component which is more dense than the other components.

According to the present invention, in one aspect there is provided a fluid separator apparatus comprising at least one cyclone for separating at least partially, if not to a substantial extent, a fraction of less dense component or components from predominantly fluid mixtures having at least one predominant liquid component, the or each cyclone being provided with means defining at least one feed inlet, means defining at least one overflow outlet for discharge of an overflow comprising a predominantly less dense components or component of said fluid mixtures, means defining at least one underflow outlet for discharge of an underflow comprising a predominantly denser component or components of said fluid mixtures, overflow conduit means to receive and conduct said overflow away from said cyclone, said overflow conduit means being connected securably to said overflow outlet means of said cyclone, support means for supporting the cyclone or cyclones in the form of a plate of pre-selected dimensions adapted to securably but releasably receive the body of the cyclone or bodies of the cyclones and receiving and transport means to receive and transport said overflow away from said overflow conduit means, said receiving and transport means being connected securably but releasably to said overflow conduit means.

In another preferred form of the invention said support means in the form of a plate as aforesaid (hereinafter described as "a support plate") may form part of or be located on or within a pressure retaining vessel. Said pressure retaining vessel may enclose at least part of one or more cyclone bodies which are received by the support plate. It may be preferable for said pressure retaining vessel to enclose all of the cyclone bodies that are received by the support plate. The support plate need not be of constant cross section. For use with particularly high pressure it may be advantageous to use a support plate of varying cross-section. Such a support plate primarily intended to support cyclones and, perhaps more importantly, divide a pressure retaining vessel into high pressure (or feed) and low pressure (or underflow) portions must be sufficiently thick to withstand this pressure differential. For reasons of economy it is advantageous to make the support plate as thin as possible. It is preferred that said support plate should contain a minimum number of holes. Necessary holes should be small. Holes which are parallel to the main faces of the support plate generally should be avoided. However, in certain situations it may be advantageous to incorporate said receiving and transport means within said support plate. Thus in one form of the invention there is provided a fluid separator apparatus as aforesaid wherein said support plate is provided with receiving and transport means within said support plate.

In another preferred form said receiving and transport means may comprise a plate of pre-selected dimensions including means for receiving and transporting said overflow and/or means adapted to define in conjunction with said support means channels for receiving and transporting said overflow.

In yet another preferred form said support means and said receiving and transport means may be at least partially securely but releasably combined as an assembly of plates. The said plate assembly preferably comprises a support plate as aforesaid and a separate removable plate (hereinafter described as "a cover plate"), that face of the cover plate coming into contact with the opposing face of the support plate being so adapted as to define, in conjunction with the opposing face of said support plate, means adapted to collect and combine the overflow from said cyclones. Such means (hereinafter described as "channel means") may take the form of grooves or channels incised, engraved, moulded, milled or otherwise provided in the face of the cover plate that comes into contact with the opposing face of the support plate. Alternatively, or additionally, grooves, channels or the like may be incised, moulded, engraved, milled or otherwise provided in said opposing face of the support plate. Conduit means may be connected to said receiving and transport means provided in said plate assembly to convey overflow away from said plate assembly.

Where a plurality of cyclones emit said overflow to said plate assembly, a plurality of channel means may be interconnected within said plate assembly.

The cover plate may be removably attached to the support plate by bolts, nuts and bolts, screws or similar attachment means. This cover plate device may contain galleries and channel means. These channel means are preferably in the form of grooves milled into the face of the cover plate facing the support plate. However, overflow may also be received and transported within the cover plate via a combination of inter-connected galleries. It is preferred that galleries open to channel means on that face of the cover plate facing the support plate to facilitate cleaning and inspection.

Where more than one cyclone body is attached to said plate assembly within a pressure retaining vessel, all cyclone bodies may transmit said overflow to galleries and channels provided in said plate assembly and said galleries and channels may be interconnected so that at least a major proportion of said overflow may exit the pressure retaining vessel preferably at a single outlet. The exit of said overflow may be via any part of the pressure retaining vessel in communication with outside parts, for example via the structural support plate and pressure vessel wall. Tubes, holes, manifolds and galleries may be used to connect the combined overflow in the plate assembly to that part or parts of the pressure retaining vessel providing said exit.

It is envisaged that the said support plate may be attached to or engaged with a pressure retaining vessel by:
1. Clamping said support plate between flanged faces of said pressure retaining vessel;
2. Welding said support plate to said pressure retaining vessel;
3. Bolting said support plate to said pressure retaining vessel;
4. Screwing said support plate to said pressure retaining vessel;
5. A combination of any one or more of the above; or
6. Other conventional means.

According to another aspect of this invention, three or more cyclone bodies may be attached to said support means preferably in the form of a support plate with the longitudinal axes of cyclones being parallel or at least approximately parallel and also with the said cyclone bodies being arranged side by side or in a triangular matrix layout. A triangular matrix layout is preferred because it allows for more dense packing of cyclones, to maximise utilization of available space.

According to yet another aspect of this invention the cyclone body/bodies may be disengaged or removed from said support means as integral units, i.e., without the need to disassemble the cyclone body or bodies whilst mounted in support means. This is believed to be advantageous in that it permits of relatively quick replacement of a defective cyclone or cyclones in the apparatus.

In addition to the possibility of having outlet means for overflow said support plate may be provided with:
1. Outlet means and associated gallery means for
    (a) taking samples of the inlet fluid mixture;
    (b) taking samples of the overflow; or
    (c) taking samples of the underflow:
2. Gallery means and connection means to connect instrumentation e.g. instrumentation for inlet fluid pressure measurements, overflow fluid pressure measurements and underflow fluid pressure measurements; or
3. Other fluid flow transport means.

Pressure limiting means may be used to limit the maximum pressure difference between inlet fluid mixture and underflow so as to limit the maximum pressure force exerted on said support plate. Said pressure limiting means may take the form of one or more pressure relief valves, burst plates, or similar devices.

In another form of this invention said cyclones may be packaged from both ends into a pressure retaining vessel there being a plurality of support plates provided within said vessel.

Thus, according to a further aspect of this invention, there is provided a fluid separator apparatus comprising a plurality of cyclones for separating at least partially, if not to a substantial extent, a fraction of less dense component or components from predominantly fluid mixtures having at least one predominant liquid component, each cyclone being provided with means defining at least one feed inlet, means defining at least one overflow outlet for discharge of an overflow comprising a predominantly less dense component or components of said fluid mixtures, means defining at least one underflow outlet for discharge of an underflow comprising a predominantly denser component or components of said fluid mixtures, and overflow conduit means to receive and conduct said overflow away from said cyclone, said overflow conduit means being connected securably to said overflow outlet means of said cyclone, a plurality of support means for supporting said cyclones in the form of plates of pre-selected dimensions adapted to securably but releasably receive the bodies of said cyclones, receiving and transport means to receive and transport said overflow away from said overflow conduit means, said receiving and transport means being connected securably but releasably to said conduit means, and a pressure retaining vessel being provided with at least one inlet means for admission of said predominantly fluid mixtures to said pressure retaining vessel, at least one outlet means for discharge of said underflow from said pressure retaining vessel, and at least one outlet means for discharge of said overflow from said pressure retaining vessel, said cyclones and support means being so disposed within said pressure retaining vessel that said cyclones discharge said underflow into at least one common cavity within said pressure retaining vessel, said support means being securably but releasably mounted within said pressure retaining vessel, said transport and receiving means also being connected securably but releasably to said at least one outlet means for discharge of overflow from said pressure retaining vessel.

In order that the present invention may be more clearly understood, reference is made to the accompanying nonlimitative drawings, which illustrates the invention by reference to embodiments. In the drawings.

Figure 1:
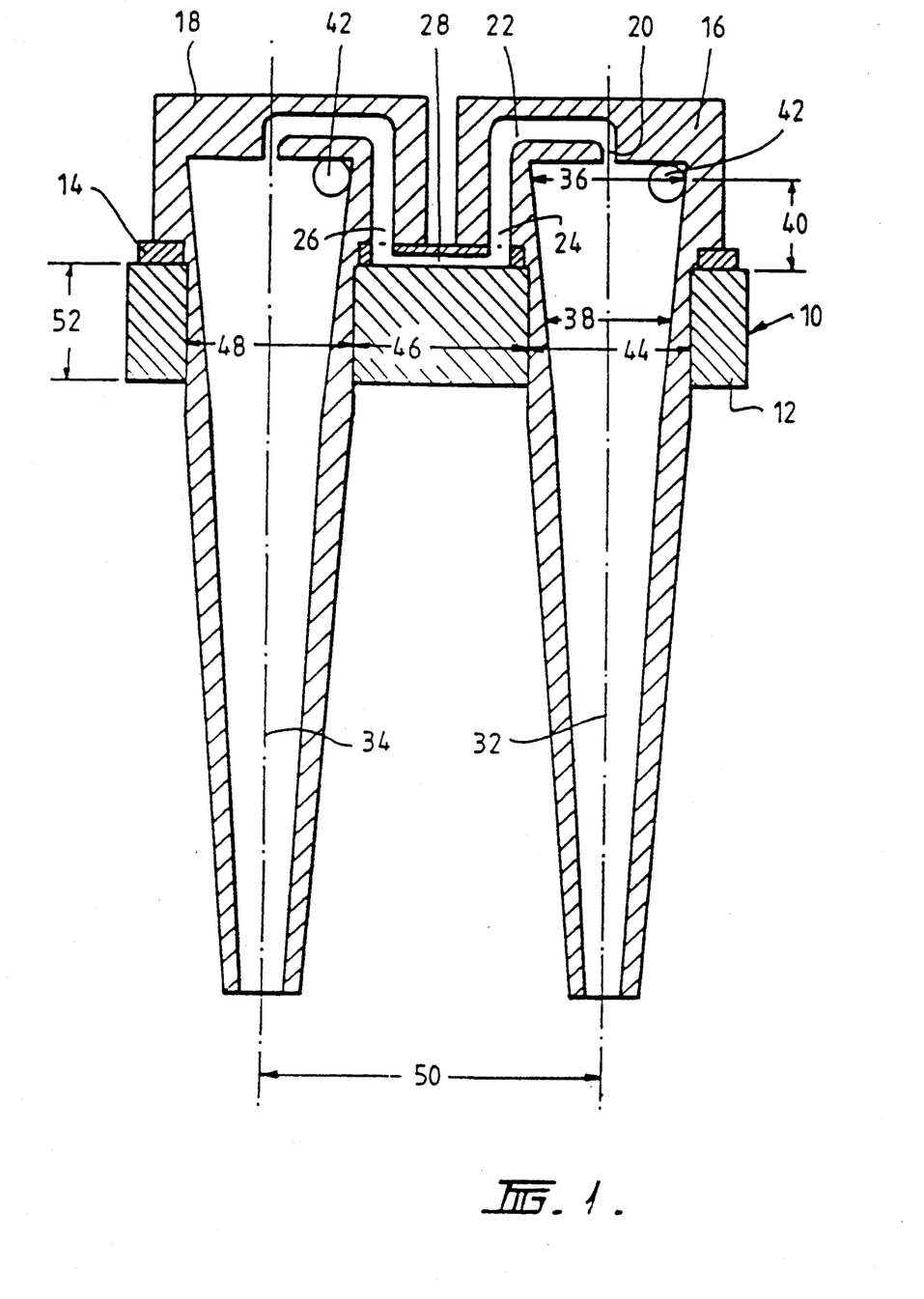
FIG. 1 is a longitudinal section through two cyclone bodies and a plate assembly.

In FIG. 1 cyclone bodies (16) and (18) are mounted in support means in the form of a plate assembly (10), comprising support plate (12) and a removable cover plate (14). The cyclone of cyclone body (16) has longitudinal axis (32) and the cyclone of cyclone body (18) has longitudinal axis (34). Axis (32) and axis (34) are at least approximately parallel, preferably parallel. Internal diameter (36) is substantially greater near cyclone inlet means (42) than the internal diameter (38) at a point adjacent to plate assembly (10). The plate assembly (10) is situated at a preselected distance (40) along the cyclone body (16) from inlet means (42) in a direction taken parallel to longitudinal axis (32).

In use overflow leaves the cyclone of cyclone body (16) by overflow exit means (20), then flows through a conduit means (22) provided in cyclone body (16). The overflow then enters channel (24) provided within plate assembly (10). Channel (24) unites with a similar channel (26) at location (28) within said plate assembly. The combined overflow exits plate assembly (10) via channel and exit means (not shown).

In a typical case, internal diameter (36) is 70 mm, internal diameter (38) is 46 mm and distance (40) is 80 mm. Because diameter (38) is relatively small compared to diameter (36), the diameter of the mounting hole (44) in plate assembly (10) in which cyclone body (16) is mounted is relatively small allowing the distance (46) between mounting hole (44) and equivalent mounting hole (48) for cyclone body (18) to be substantial thereby substantially maintaining acceptable structural strength. A relatively large distance (40) is believed to permit relatively close cyclone spacing (50) and/or relatively small plate thickness (52). If available space for installing cyclones is small, e.g. on an oil production platform, it may be advantageous to have cyclone spacing (50) small.

Figure 2:
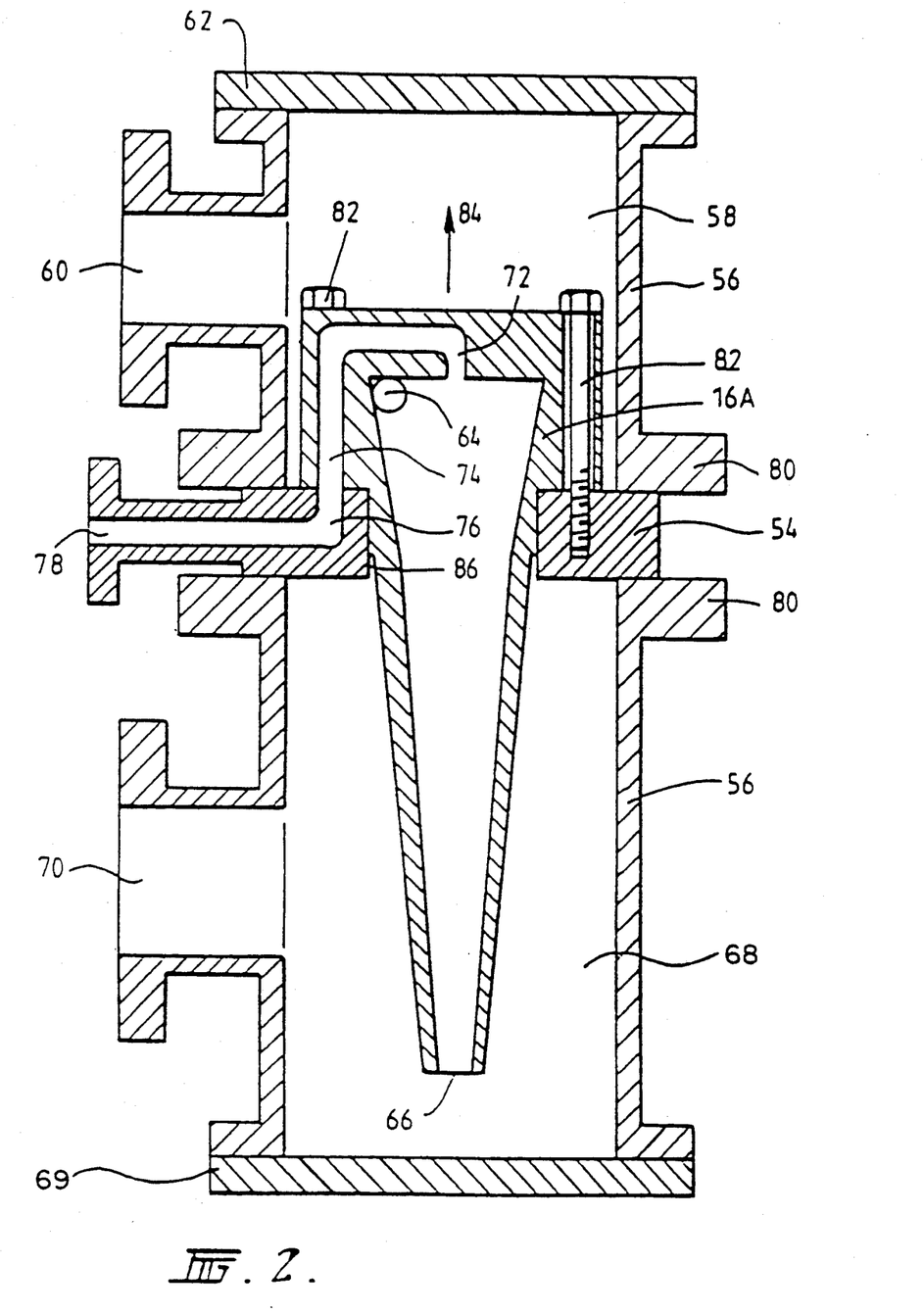
FIG. 2 is a longitudinal section through a pressure retaining vessel containing a cyclone body and a combined support plate and receiving and transport means.

In FIG. 2, support means, in the form of a plate (54), and a cyclone body (16A), are enclosed within a pressure vessel (56). In this embodiment, with a single cyclone, it is not necessary for the support means and receiving and transport means to comprise a separate cover plate and a separate support plate and the cyclone body is mounted securably but releasably in a support plate provided with receiving and transport means. It is believed that this approach is not readily feasible with multiple cyclones. Inlet fluid mixture enters upper cavity (58) in said pressure vessel through pressure vessel inlet means (60), said upper cavity (58) being defined by upper wall or walls and upper closure (62) of pressure vessel (56), that part of cyclone body (16A) being above the plane of upper face of plate (54), and upper face of plate (54). Fluid in upper cavity (58) may enter the interior of cyclone body (16A) via cyclone inlet means (64). Underflow leaves the cyclone body (16A) at underflow exit means (66) and enters lower cavity (68) defined by lower wall or walls and lower closure (69) of pressure vessel (56), lower part of cyclone body (16A) and lower face of plate (54). Underflow may exit lower cavity (68) via pressure vessel underflow exit means (70).

Overflow exits the cyclone at overflow exit means (72) and then flows through conduit (74) to gallery (76) provided within plate (54) and exits plate (54) at plate overflow exit means (78). Plate (54) is clamped or otherwise secured, optionally releasably, between flanges (80) of said pressure retaining vessel (56). Upper closure (62) may be removable to allow personnel to gain access to cyclone body (16A).

Bolts (82) may be used to hold cyclone body (16A) securely to plate (54). In this example, cyclone body (16A) is not attached to any other support means. However, other support means besides plate (54) may be used. Said bolts (82) may be removed to allow said cyclone body (16A) to be withdrawn as a single unit from plate (54) in the direction shown by arrow (84).

As previously stated, cyclone body (16A) may be removed from support means formed by plate (54). In this circumstance the mounting hole (86) in plate (54) into which cyclone body (16A) may be fitted, may be plugged to prevent any significant fluid flow through said hole (86) from upper cavity (58) to lower cavity (68). Where a support means such as a plate is designed to accept more than one cyclone body, said plate may have at least one cyclone body missing and plug means inserted into the mounting hole/s not occupied by cyclone bodies to prevent significant fluid flows directly between upper cavity containing inlet fluid to be separated, lower cavity containing underflow and galleries containing overflow.

Figure 3:
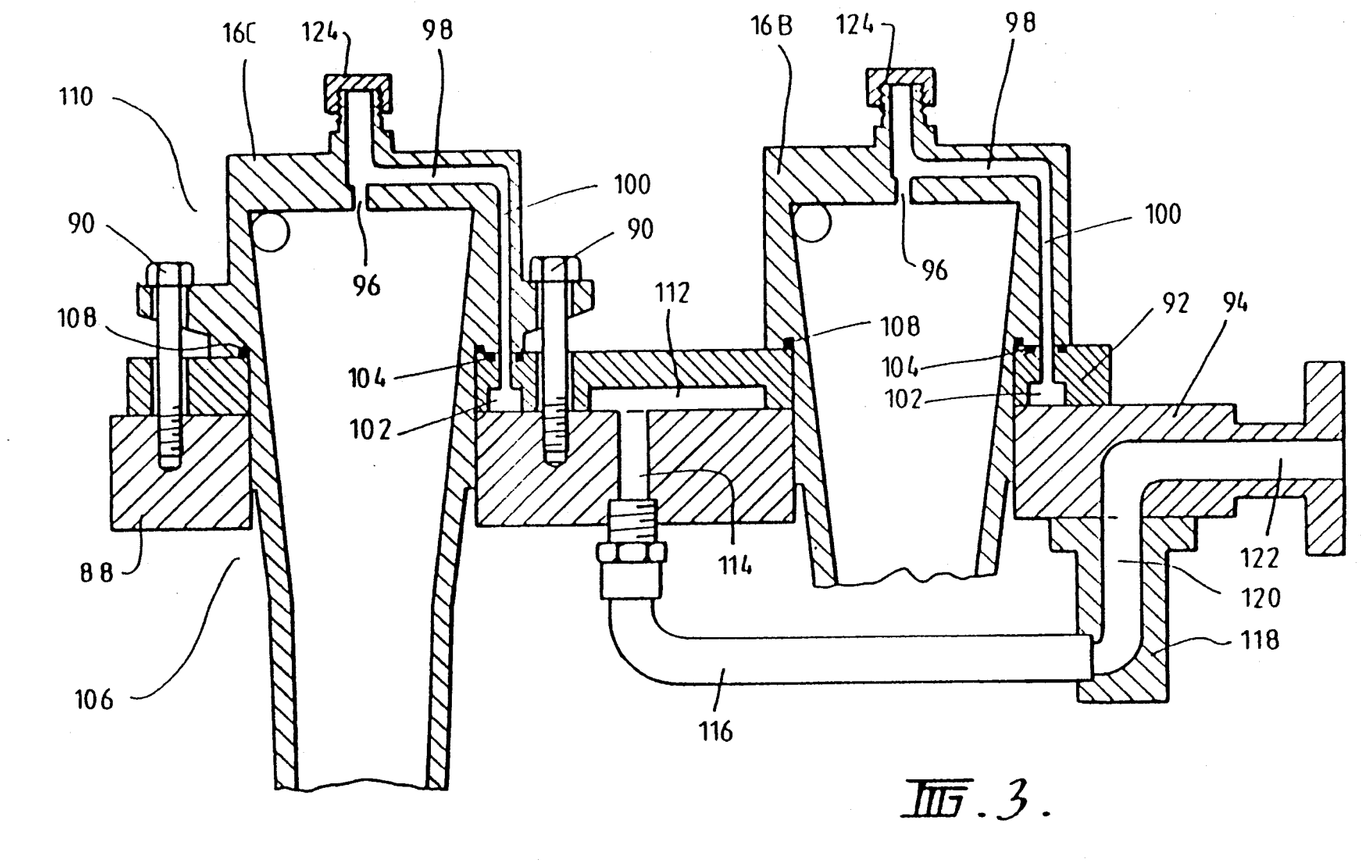
FIG. 3 is a partial longitudinal section in the region of the inlet ends of two cyclone bodies and a plate assembly.

In FIG. 3 cyclone body (16B) and cyclone body (16C) are attached to a plate assembly (88) using bolts (90) (not all shown). Plate assembly consists of support plate (94) and cover plate (92). Preferably the cyclones bodies are bolted to the cover plate. However it is also possible to bolt the cyclones directly to the support plate (94). It is advantageous to securably but releasably fix cover plate (92) to support plate (94). Sealing means, optionally in the form of an "O" ring (104), are provided between said cyclone body (16C) and cover plate (92) to prevent significant fluid flow of underflow entering channel (102) via the outside of cyclone body (16C) from lower cavity (106). Sealing means (108) is provided to prevent significant fluid flow of inlet fluid mixture entering channel (102) between said cyclone body (16C) and plate assembly (88) from (high pressure area) upper cavity (110).

Overflow exists interior of cyclone body (16C) at overflow exit means (96) and flows into conduit (98) and (100) in cyclone body (16C), thence into a channel (102) defined by a groove provided in cover plate (92) and the opposing face of support plate (94). Overflow may flow through channel (102) into a gallery (112) provided within plate assembly (88) via a channel (not shown). Analogously, overflow from interior of said cyclone body (16B) flows through similar conduit and gallery and channel means. Overflow from gallery (112) flows into gallery means (114) passing through support plate (94).

Said gallery means (114) are connected with tubing means (116) which are connected with manifold means (118). One or more such tubing means may connect with said manifold means (118) to carry overflow from other cyclones not shown. Fluid in said manifold means (118) flows into gallery means (120) which connects with nozzle means (122) for exit from the apparatus. Said tubing means (116) and said manifold means (118) may form part of plate (94) or may be attached to plate (94) in a conventional manner.

Tubing means (116) and said manifold means (118) are preferably constructed without sharp bends so as to allow cleaning means including flexible rod means (e.g. wire) to be inserted into gallery means (120) and pushed through manifold means (118), tubing means (116), and gallery means (114) to allow clearing of blockages. Cyclone body (16C) may be fitted with cap or plug (124) which may be removed to allow a rod to be inserted into overflow exit means (96) to dislodge blockage material.

Alternatively, fluid under high pressure may be introduced through nozzle means (122) to purge any total or partial blockages in support plate gallery means, tubing means, manifold means or other regions where overflow may flow. Flow paths for overflow in said cyclone body (16C) including overflow exit means (96) may also be purged of any partial or total blockages by the same means.

During normal operation, inlet fluid mixture in upper cavity (110) generally will be at a higher pressure than underflow fluid in lower cavity (106) and overflow fluids in interior of cyclone body (16C) and plate assembly (88). This is believed to cause a net force to act on cyclone body (16C) in a direction from upper cavity (110) towards lower cavity (106) forcing cyclone body (16C) against plate assembly (88). This force may assist bolts (90) to hold cyclone body (16C) securely against plate assembly (88) and may assist the sealing action of sealing means (104) and (108).

Overflow fluid will normally be at a pressure lower than that of the inlet fluid mixture and that of the underflow fluid and thus any fluid leaking past said sealing means (104) or (108) will normally flow into overflow gallery means, tubing means, manifold means and other overflow flow paths, thereby contaminating the overflow fluid.

Figure 4:
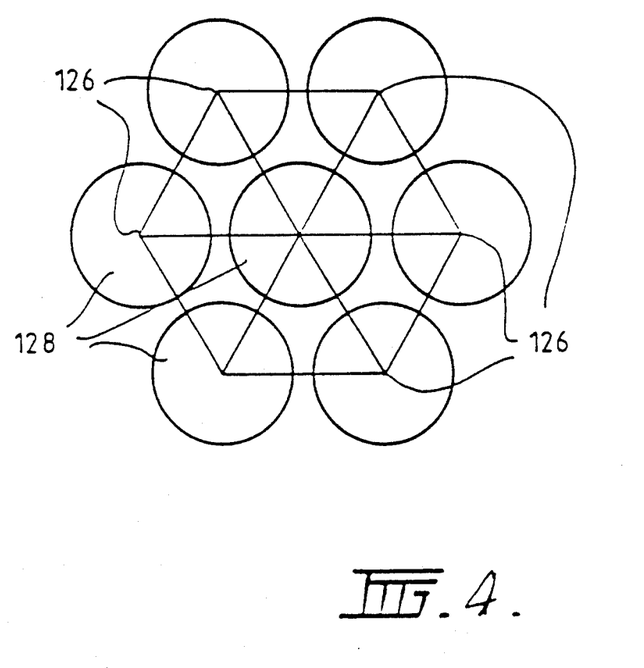
FIG. 4 is a schematic plan view of an arrangement of cyclone bodies.

In FIG. 4 seven cyclones with parallel longitudinal axes (126) are arranged in a triangular matrix layout. In this example, diameter (128) is the diameter of the cyclone body near the cyclone inlet and is the largest external diameter of the cyclone body. The cyclones are arranged with minimal gaps between the cyclone bodies as defined in external diameters (128).

The packaging of cyclones from both ends into pressure retaining vessels may exhibit advantages of reducing space, weight and cost of manufacture and maintenance.

Figure 5:
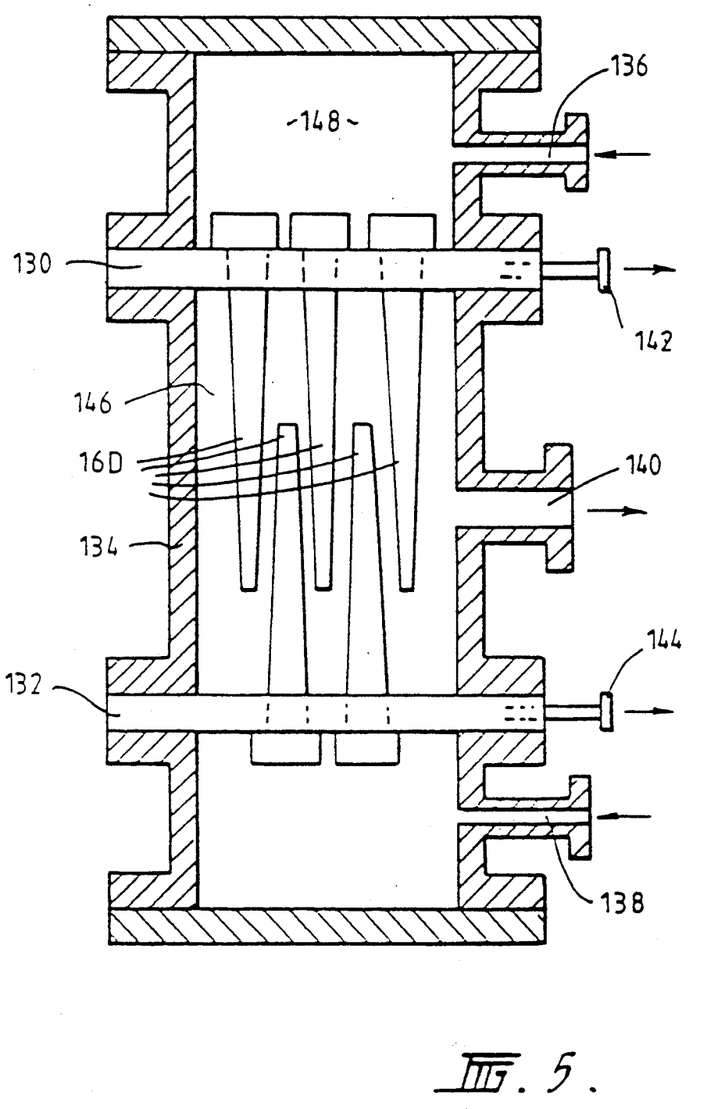
FIG. 5 is a longitudinal section through a pressure retaining vessel containing a number of cyclones and a plurality of plate assemblies.

In FIG. 5, cyclone bodies (16D) are attached to plate assemblies (130) and (132) which are secured within a pressure retaining vessel (134). Inlet fluid mixture to be separated enters pressure retaining vessel (134) via inlet means (136) and (138). Underflow exits said pressure retaining vessel (134) via pressure retaining vessel underflow exit means (140). Overflow exits plate assembly (130) at exit support means (142) and plate assembly (132) at exit support means (144).

In another form of this invention central cavity (146) of pressure retaining vessel (134) containing underflow may be used to separate gas from liquid. For example if the longitudinal axis of pressure retaining vessel (134) were vertical, gas in central cavity (146) may migrate toward plate assembly (130). Said gas may exit pressure retaining vessel (134) from central cavity (146) by means (not shown) adjacent to plate assembly (130) or alternatively by gallery means (not shown) within plate assembly (130). In another aspect of the invention where upper cavity (148) contains a volume of fluid mixture to be separated mixed with chemicals the volume of cavity (148) may be sufficiently large to allow sufficient residence time so that the said fluid mixture and chemicals can react to a desired extent.

We claim:

1. Apparatus for separating, into lighter overflow and heavier underflow fractions, a fluid mixture having a higher density liquid component and a lower density component, said apparatus comprising:

a pressure retaining vessel having: an opening with a removable closure, a first region of high pressure adjacent to said closure and a second region of low pressure, inlet means for admitting the fluid mixture into said first region, overflow discharge means for exit of said lighter fraction, and underflow discharge means for exit of said heavier fraction from said second region;

a support plate contained within said vessel; and a plurality of separating cyclones, each of said cyclones having a body which extends through a respective aperture in, and which is releasably, rigidly secured to said support plate by respective securing means engaging, and extending between, each of said cyclones and said support plate, the securing means for a given one of said cyclones of said plurality of cyclones being separate from the securing means for the other ones of said plurality of cyclones, each said cyclone body having at least one feed inlet in communication with said first region for receiving the fluid mixture, underflow outlet means in communication with said second region, and overflow outlet means in communication with said vessel overflow discharge means, said securing means for said cyclone bodies being accessible from said opening through said first region, whereby after removal of said closure, each cyclone body can, upon releasing said respective securing means, be individually released from, and withdrawn through, said support plate and out of said vessel opening for replacement.

2. Apparatus according to claim 1, wherein said cyclone overflow outlet means communicate with said vessel overflow discharge means via gallery means provided at least partly in said support plate.

3. Apparatus according to claim 2, wherein said gallery means is at least partly provided between opposing faces of said support plate and of a cover plate lying on said support plate, one of said opposed faces being formed with channels.

4. Apparatus according to claim 2, wherein said securing means comprises bolts by means of which each said cyclone body is bolted to said support plate, drawing up of said bolts automatically creating a seal between aligned parts of said cyclone overflow outlet means of that cyclone and said gallery means.

5. Apparatus according to claim 1, wherein said support plate divides the interior of said vessel into said first and second regions.

* * * * *